3,024,293
PROCESS FOR REMOVING ALUMINUM CHLO-
RIDE CATALYST FROM POLYPROPYLENE OIL
John W. Nelson, Lansing, John A. Lundquist, Park
 Forest, and David W. Young, Homewood, Ill., assign-
 ors to Sinclair Refining Company
No Drawing. Filed Nov. 4, 1959, Ser. No. 850,772
14 Claims. (Cl. 260—683.15)

This invention is a process for making polypropylene oil and includes polymerization of propylene and purification of the polymerization product. Polypropylene oil is a liquid, more or less viscous, polymer having value as a softener or plasticizer for calking compounds and electrical insulation, and as an additive for lubricating oils. In addition, the tacky and non-drying properties of polypropylene oil make it suitable for use in adhesives for pressure sensitive tapes, printing inks and wax coatings. These latter applications frequently require a transparent adhesive; however, although some known processes for making polypropylene oil give a clear diluted polymer reaction product containing a dissolved catalyst, partial concentration of the polymer-diluent solution results in a heterogeneous, hazy mixture of polymer and solid catalyst. Filtration of this mixture removes the visible solid but further concentration or complete diluent removal from the filtrate results in a cloudy product. Filtration after complete removal of the diluent, due to the viscous nature of the polymer is slow and expensive.

The process of this invention obviates the need for filtration of the polymerizate and yet produces an essentially water-white product suitable even for use in applications requiring transparency. The process of this invention comprises polymerizing propylene in the presence of dissolved $AlCl_3$ at a low temperature and treating the reaction product with a dihydric alcohol to remove insolubles and coloring matter from the product.

The polymerization is conducted with the propylene in the liquid state and at a low temperature provided by direct or indirect cooling. The temperature of solid carbon dioxide, $-78°$ C., is convenient and preferred, but the polymerization temperature may range from about $-150°$ C. to the boiling point of propylene at the pressure used, advantageously from about $-100°$ C. to $-50°$ S. The pressure during polymerization is generally atmospheric but may range from below atmospheric to 250 p.s.i.g. or more. To insure that the propylene will be in the liquid state for the polymerization reaction as well as to slow the speed of the reaction and dissipate heat, an inert hydrocarbon diluent may be used in an amount of about 100% to 600% or more based on the weight of the propylene. This diluent is a solvent for the propylene and is advantageously a hydrocarbon such as a low-boiling paraffin, including cycloparaffin, of 5 to 12 carbon atoms, e.g. normal and isopentane, normal, iso- and cyclohexane and the like, including mixtures of these hydrocarbons. Normal pentane and hexane are preferred for reasons of economy, although the diluent is recoverable after the polymerization.

The polymerization of propylene requires that the aluminum chloride catalyst be in solution, and since its solubility in the paraffin diluent is limited, a solvent is used for the catalyst which is compatible with the reaction mixture. Lower alkyl halides are suitable solvents and ethyl and methyl chlorides are preferred. A proportion of solvent is generally used which will provide a catalyst solution containing about 0.1 or 1% to 10% $AlCl_3$, preferably about 4% to 6%, and any catalyst over what is soluble is essentially wasted. The amount of catalyst solution preferred in the polymerization process will generally be sufficient to provide about 0.5% to 8% by weight of $AlCl_3$ based on the propylene, advantageously about 1% to 3%. It also is helpful to include in the polymerization mixture a reaction initiator such as tertiary butyl chloride, isobutylene, or other tertiary carbonium ion producer, for instance, in a proportion of about one part initiator to 35 parts catalyst. It also may be found advantageous to include in the polymerization mixture an oxidation inhibitor such as 2,6-di(t-butyl)-4-methyl phenol in order to prevent oxidative side reactions.

The polymerization results in the formation of polypropylene in good yields. The polymer, after separation from the other ingredients of the reaction product is a liquid usually having a viscosity at $210°$ F., ranging from about 500 to 4000 SUS and a Staudinger molecular weight of about 900 to 2200.

An important aspect of this invention is the removal of the $AlCl_3$ catalyst without creation of haze in the polymer product. This is done by mixing the reaction product with an anhydrous glycol-containing liquid having a greater specific gravity than the concentrated polymer-diluent solution and allowing the mixture to stratify. The aluminum chloride settles in the lower layer with the glycol, leaving a clear upper layer.

The glycol-containing liquid generally has at least about 10% glycol. The glycol is usually an aliphatic glycol of say, 2 to 5 carbon atoms and the other ingredient of the liquid mixture when present can be a solvent for the glycol. Methanol is the preferred solvent and its mixture with ethylene glycol may contain about 1 to 3 parts of glycol for each 8 parts of methanol.

Generally about 0.1 to 1 parts of glycol containing liquid, preferably 0.25 to 0.5 part are used per part of polymer reaction product. When using a liquid mixture of methanol and ethylene glycol, glycol is usually at least about 0.01, preferably at least about 0.05 percent of the polymer reaction product.

It is important that the glycol material be substantially free from water since hydrolysis of the aluminum chloride must be avoided if a haze-free product is to be recovered without filtration. Among the useful polyhydric alcohols are ethylene glycol and propylene glycol. Preferably, the initial glycol wash with the glycol-methanol medium is conducted by incorporating the methanol and then adding the glycol when the temperature of the reaction product has risen at least to the freezing point of the glycol.

After the glycol is added the glycol-catalyst layer is removed from the polymer by liquid-liquid separation, i.e. separated from each other as liquid phases. This may be accomplished by allowing the mixture to settle, preferably at a temperature up to about $10°$ C. A further quantity of glycol-containing liquid is then added to the polymer layer, the amount usually being in the range previously set forth. The resulting mixture is preferably subjected to distillation to reduce its volume substantially, say by about 35 to 60%, by vaporization of the diluent and the catalyst solvent. The distillation to reduce the volume of the reaction mass may be conducted prior to the second glycol wash particularly when using a glycol-methanol washing medium. The glycol layer is once more removed by liquid-liquid separation and a third washing with a similar amount of glycol may, if desired, be performed, followed by washing with an aqueous medium until the wash water is essentially neutral.

It has been found that treatment with a glycol removes the brownish tinge frequently associated with products produced by catalysis with $AlCl_3$. After the washing, the diluent is removed, for instance by subjecting the mass to vacuum topping. The diluent and catalyst solvent are generally recovered for reuse. The glycol may also be recycled after removing spent catalyst from it.

This glycol regeneration may be performed, for example by treating the contaminated glycol with sodium or potassium bicarbonate at a pH below about 10 and distilling off the water resulting from this treatment. This is followed by filtration or centrifugation to remove the precipitate from the glycol. Alternatively, the glycol may be treated with a water slurry of limestone or similar carbonate followed by dehydration and filtration or centrifugation. When a methanol-glycol mixture is used the methanol is advantageously recovered by distillation after the alkaline catalyst precipitation procedure.

The following examples of the practice of this invention are not to be considered as limiting.

*Example I*

To a jacketed vacuum vessel equipped with an air driven stirrer and thermometer were charged 1200 g. of powdered $CO_2$, 1300 g. pentane, 400 g. propylene, 8 g. aluminum chloride dissolved in 151 g. ethyl chloride all at −78° C. and 1 g. 2,6-di(tert-butyl)-4-methyl phenol dissolved in 20 g. pentane at room temperature. After stirring 4 minutes, 2.5 g. tert-butyl chloride were added. After one hour of reaction time, 2 g. more of tert-butyl chloride were added but no foaming occurred indicating the reaction was complete. The mass was then poured into a beaker, leaving about 100 g. $CO_2$ in the vacuum vessel. While stirring the liquid, still at −78° C. 100 g. ethylene glycol were added slowly. The color changed from tan to almost white. After stirring 40 minutes the temperautre had risen to 6° C., the mass was settled in a vessel and the glycol layer weighing 111 g. was dropped out of the lower part of the vessel. One gram of Deenex (2,6-di(tert-butyl)-4-methyl phenol) and 100 g. ethylene glycol were then added and the solution evaporated on a steam bath until it weighed 838 g. The glycol layer was again dropped and the mass was further washed with 100 g. ethylene glycol followed by two 100 g. water washes. It was topped to 215° C. at 6 mm. pressure. The crystal clear product weighed 288 g. representing a 72% yield. It had a 2730 SUS viscosity at 210° F. and had a 500° F. flash.

*Example II*

In a reaction similar to Example I, no tertiary butyl chloride was used as an initiator and hydrochloric acid was used in the purification procedure to remove the spent catalyst in the form of water soluble aluminum chloride. The product was hazy and weighed 279 g. representing a 70% yield. It analyzed 2860 SUS at 210° F., 530° F. flash, 0.015% ash, and had a bromine number of 7.1.

*Example III*

In a run similar to Example I, 400 g. propylene, 1100 g. solid $CO_2$, 1300 g. pentane, 2.5 g. Deenex, and 1.5 g. tert-butyl chloride were employed. The catalyst used was 9 g. $AlCl_3$ dissolved in 168 g. ethyl chloride. After about 50 minutes and complete reaction, 40 g. of methanol were added to deactivate the catalyst. The temperature of the mass was raised to −9° C. and 10 g. ethylene glycol were added. Stirring was continued for 6 minutes and then the mass was settled for 23 minutes. At 9° C. the water-white clear solution, weighing 1608 g. was decanted from the glycol-catalyst complex and evaporated on a steam bath to 680 g. The liquid was transferred to a separatory funnel, settled 10 minutes and the glycol layer dropped. It was again washed with the same amount of methanol-glycol but was too viscous for rapid separation, so 100 g. pentane were added. It was again given a glycol-methanol wash followed by three 300 g. water washes. It was then topped to 218° C. at 6 mm. pressure. The water-white clear product analyzed 2900 SUS at 210° F. viscosity, 0.005% ash and bromine number 5.6.

The following materials were used to remove spent catalyst in aluminum chloride catalyzed polymerization but were unsuccessful in making a clear, white product: Methanol, methanol-water, glycerine, glycerine-water, sodium hydroxide-water to pH over 11, hydrochloric acid to pH less than 4, isopropanol, isopropanol-water, and ammonium hydroxide. These experiments point out the need for glycol and anhydrous conditions in the wash to produce a transparent product.

We claim:
1. A method for the production of polypropylene oil which comprises polymerizing propylene in the liquid phase and in the presence of an inert hydrocarbon diluent and dissolved $AlCl_3$ catalyst to obtain polymer oil, combining the reaction product with a substantially water-free glycol of about 2 to 5 carbon atoms, and separating the resulting substantially water-free glycol-catalyst mixture by liquid-liquid separation from the polymer oil to remove the catalyst to obtain a haze-free polymer oil while avoiding hydrolysis of the catalyst.

2. The method of claim 1 in which the substantially water-free glycol is ethylene glycol.

3. The method of claim 1 in which the substantially water-free glycol is in admixture with methanol.

4. The method of claim 3 in which the mixture has about 1 to 3 parts of ethylene glycol to 8 parts of methanol.

5. The method of claim 1 in which an initial substantially water-free glycol combination and separaton of the polymer are made, substantially water-free glycol is again added to the polymer, the substantially water-free glycol-polymer mixture is distilled to reduce its volume by about 35 to 60%, and the polymer oil separated.

6. A method for the production of polypropylene oil which comprises polymerizing propylene in the liquid phase at a temperature of about −100 to −50° C. and in the presence of about 100 to 600% based upon the weight of said propylene of an inert hydrocarbon diluent which is a paraffin of 5 to 12 carbon atoms and about 0.1 to 10% based upon said propylene of $AlCl_3$ catalyst dissolved in a lower alkyl halide solvent to obtain polymer oil, combining the reaction mixture with about 0.1 to 1 part of a substantially water-free glycol of 2 to 5 carbon atoms per part of the reaction product, separating the resulting glycol-catalyst mixture by liquid-liquid separation from the polymer oil while avoiding hydrolysis of the catalyst, distilling said reaction mixture to reduce its volume by about 35 to 60% through vaporization of the hydrocarbon dilluent and the catalyst solvent, washing the remaining reaction mixture with an aqueous medium until said medium is essentially neutral, and vacuum topping the reaction mixture to remove remaining hydrocarbon diluent and catalyst solvent and obtain a haze-free polymer oil product.

7. The method of claim 6 in which the substantially water-free glycol is ethylene glycol.

8. The method of claim 6 in which the substantially water-free glycol is in admixture with methanol.

9. The method of claim 8 in which the glycol-methanol mixture has about 1 to 3 parts of glycol to 8 parts of methanol.

10. A method for the production of polypropylene oil which comprises polymerizing propylene in the liquid phase at a temperature of about −100 to −50° C. and in the presence of about 100 to 600% based upon the weight of said propylene of an inert hydrocarbon diluent which is a paraffin of 5 to 12 carbon atoms and about 1 to 6% based upon said propylene of $AlCl_3$ catalyst dissolved in a lower alkyl halide solvent to obtain polymer oil, combining the reaction mixture with about 0.1 to 1 part of a substantially water-free glycol of 2 to 5 carbon atoms per part of the reaction product, separating the resulting glycol-catalyst mixture by liquid-liquid separation from the polymer oil while avoiding hydrolysis of the catalyst, distilling said reaction mixture to reduce its volume by about 35 to 60% through vaporization of the hydrocarbon diluent and the catalyst solvent, adding to the remaining reaction mixture about 0.1 to 1 part of substantially water-free glycol of 2 to 5 carbon atoms in an amount of about 0.1 to 1 part of glycol per part of polymer oil, removing the glycol layer by liquid-liquid separation from the reaction mixture, washing the remaining reaction mixture with an aqueous medium until said medium is essentially neutral, and vacuum topping the reaction mixture to remove remaining hydrocarbon diluent and catalyst solvent and obtain a haze-free polymer oil product.

11. The method of claim 10 in which the $AlCl_3$ catalyst is dissolved in ethyl chloride.

12. The method of claim 10 in which the substantially water-free glycol is ethylene glycol.

13. The method of claim 10 in which the substantially water-free glycol is in admixture with methanol.

14. The method of claim 13 in which the glycol-methanol mixture has about 1 to 3 parts of glycol to 8 parts of methanol.

References Cited in the file of this patent

UNITED STATES PATENTS

| | | |
|---|---|---|
| 2,521,940 | Oriolo | Sept. 12, 1950 |
| 2,746,925 | Garber et al. | May 22, 1956 |
| 2,919,264 | Frese et al. | Dec. 29, 1959 |